(12) United States Patent
Dürre

(10) Patent No.: US 6,435,540 B1
(45) Date of Patent: Aug. 20, 2002

(54) GAS INFLATOR FOR AN AIRBAG FOR REDUCING VIBRATION IN A STEERING COLUMN

(75) Inventor: Markus Dürre, Müllheim (DE)

(73) Assignee: Firma Carl Freudenberg, Weinheim (DE)

(*) Notice: Subject to any disclaimer, the term of this patent is extended or adjusted under 35 U.S.C. 154(b) by 0 days.

(21) Appl. No.: 09/715,300

(22) Filed: Nov. 17, 2000

(30) Foreign Application Priority Data

Nov. 18, 1999 (DE) .......................... 199 55 426

(51) Int. Cl.$^7$ .............................................. B60R 21/16
(52) U.S. Cl. ..................... 280/728.2; 280/731
(58) Field of Search .......................... 280/728.2, 731, 280/736, 741

(56) References Cited

U.S. PATENT DOCUMENTS 5,024,464 A * 6/1991 Kawaguchi et al.
6,361,065 B1 * 3/2002 Frisch ..................... 280/728.2

FOREIGN PATENT DOCUMENTS

| DE | 39 25 761 | 2/1990 | |
|---|---|---|---|
| DE | 299 02 033 | 5/1999 | |
| EP | 1026050 A2 * | 8/2000 | ........... B60R/21/20 |
| JP | 2000225910 A * | 8/2000 | ........... B60R/21/20 |

* cited by examiner

Primary Examiner—Paul N. Dickson
Assistant Examiner—Joselynn Y. Sliteris
(74) Attorney, Agent, or Firm—Kenyon & Kenyon

(57) ABSTRACT

A gas inflator is movably supported in a spacer pot and/or in a protective sleeve of an airbag housing, and functions as a vibration damper weight. An annular spring element made of polymer material that is impermeable to gas is joined to the gas inflator's outer wall and to a supporting plate. A vacant vibration space is formed for the vibration damper weight between the gas inflator and the interior wall of the spacer pot or protective sleeve. The spring element is provided with a plurality of elastic projections that are distributed on the exterior periphery of the spring element. The projections cause a defined deceleration of the vibration weight in response to the traversing of the vacant vibration space.

11 Claims, 6 Drawing Sheets

GAS INFLATOR FOR AN AIRBAG FOR REDUCING VIBRATION IN A STEERING COLUMN

FIELD OF THE INVENTION

The present invention relates to a gas inflator for an airbag on a motor vehicle steering wheel. In particular, the present invention relates to a gas inflator which reduces vibrations in a steering column.

BACKGROUND OF THE INVENTION

In motor vehicles, vibrations arising during driving or even during idling can be transmitted to the steering column and from there to the steering wheel. To counteract these vibrations in the steering wheel and to improve driving comfort, vibration dampers have been installed either directly on the steering column or in the steering wheel beneath the airbag module located there. More recent solutions use the airbag module or the gas inflator of the airbag module as a vibration damper.

From German Published Patent Application 39 25 761, by way of example, a design is known in which either the airbag module or a part of it, in this case, the gas inflator, is used as the inertial mass. In the event that the gas inflator is the inertial mass, the gas inflator is surrounded by a netlike encasement, which prevents the airbag and the gas inflator from coming into contact with each other. The airbag could be damaged in this way and the mobility of the gas inflator could be impaired. In one configuration of this type of airbag and gas inflator, a self-activation of the gas inflator is possible because the latter can vibrate at high rates of acceleration. It is also disadvantageous that the chosen connecting means between the gas inflator and the airbag, bolts or rivets having elastic sleeves, only permit small vibration amplitudes. The deformation capacity of the elastic means employed is sharply limited by the connecting means themselves (rivets, bolts).

Another solution, disclosed in the German Design Patent 299 02 033, is made up of an annular metal mounting plate arranged on the gas inflator support, a circumferential mounting flange connected to the housing of the gas inflator, and a mounting cylinder, made of an elastic material and oriented parallel to the steering axis. The free edges of the mounting cylinder are connected, on the one hand, to the mounting metal plate and, on the other hand, to the mounting flange. In this manner, only the gas inflator is connected to the remaining components of the airbag module via the mounting cylinder made of an elastic material. As a result of the design shape and the material selection, the mounting cylinder can be adjusted to varying requirements, so that the vibrations, varying from vehicle type to vehicle type, can be effectively suppressed. Although this solution provides a very effective vibration damping, the explosive and the other components of the gas inflator can be destroyed by excessive accelerations (impacts). This is especially the case when a spacer pot is provided between the gas inflator and airbag for the protection of the airbag, and the gas inflator strikes against the wall of the spacer pot. Furthermore, the noise generated by the gas inflator striking against the wall of the spacer pot is annoying.

SUMMARY OF THE INVENTION

The present invention is based on the objective of finding a design configuration for the airbag module in which the aforementioned disadvantages are avoided. In accordance with this objective, a gas inflator for an airbag is movably mounted in a spacer pot and/or protective sleeve of an airbag housing by annular spring element made of a polymer material. The annular spring element is impermeable to gas, and is connected to the gas inflators' outer wall, and to a supporting plate. A vacant space is formed between the gas inflator and the interior wall of the spacer pot or protective sleeve, and the gas inflator functions as an inertial mass. The annular spring element has a plurality of elastic projection distributed on its exterior periphery. The elastic projections dampen impacts by causing a defined deceleration of the gas generator in response to the transversing of the vacant space. In this manner, damage to the gas inflator or to parts of gas inflator is prevented.

The spring element is configured as a sleeve-shaped truncated cone open at the top. This configuration of the spring element yields production-technical advantages in vulcanizing and counteracts the vibrating motions of the gas inflator in the radial direction.

Preferably, the projections are arranged on the part of the spring element that is connected to the gas inflator. The connection between the gas inflator and the spring element is preferably effected by an interior ring, which is pressed, in a force fit, onto the exterior wall of the gas inflator. The ring is connected by vulcanization to the spring element. It is expedient if the ring extends over the entire height of the projections. Of course, it is also possible to connect the ring to the exterior wall of the generator, the wall being configured in a form-locking manner. To make it easier to install the ring on the exterior wall of the gas inflator, the ring at its upper edge is slightly flattened down. In this manner, a funnel-like rounding-off is produced which makes the mounting of the ring easier. Other design solutions are possible here without moving away from the inventive idea.

The end of the spring element that is connected to the supporting plate is vulcanized to the supporting plate. In this context, it is expedient if the end of the spring element surrounds the edge of the supporting plate in a bead-like manner.

By shaping the projections, a defined spring rate can be preestablished. In this way, the projections can each have at least one lip-shaped or truncated-cone-shaped protuberance. The smaller the contact surface between the protuberance and the spacer pot, the greater the spring rate and vice versa. The projections also prevent a smacking noise from arising from surface contact between the spring element and the spacer pot.

BRIEF DESCRIPTION OF THE DRAWINGS

The present invention is explained in greater detail below on the basis of the drawings.

DETAILED DESCRIPTION OF THE INVENTION

Figure 1:
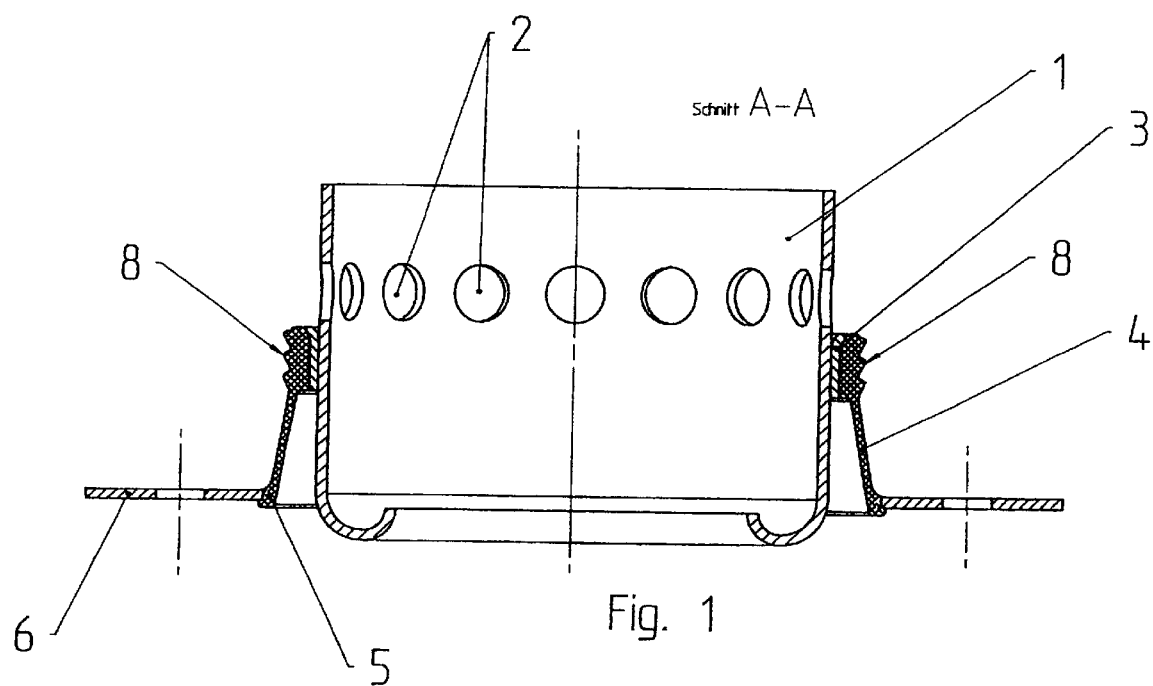
FIG. 1 depicts a cutaway view of the gas inflator housing along the line A—A in FIG. 2.

FIG. 1 depicts a housing 1 for a gas inflator of a steering wheel airbag in a cutaway view. The housing 1 accommodates the explosive packing and is open on the top for the discharge of the explosive gases. On the side of the housing 1, through openings 2 are provided. The housing 1 is encircled by a mounting ring 3, which is connected to the housing 1 in a force fit. Fastened on the mounting ring 3 is a spring element 4. Spring element 4 is configured as an annular membrane and at least partially surrounds the housing 1. In the exemplary embodiment, the spring element 4 is configured as a sleeve-shaped truncated cone. At its lower end 5, the spring element 4 is connected to a supporting plate 6. The connection is effected by vulcanization in the same way as the connection of the ring 3 to the spring element 4.

The supporting plate 6 is provided with mounting openings 7 for attachment bolts or the like, for mounting the supporting plate 6 on the airbag housing.

The spring element 4 is furnished with a multiplicity of elastic projections 8 distributed over its circumference. The projections effect an additional deceleration of the vibration weight constituted by the gas inflator in response to traversing the vacant vibration space. Vibrations emanating from the steering wheel column and transferred to the supporting plate 6 are dampened by the spring-element 4 and the damper weight constituted by the gas inflator. In this context, the truncated-cone-shaped configuration of spring element 4 yields particularly favorable results. However, in the event that the damper weight traverses a preselected vibration space, the elastic projections 8 on the wall of a spacer pot 9 or protective sleeve surrounding the gas inflator come into play and, in a predetermined manner, dampen the vibration of the gas inflator.

Figure 2:
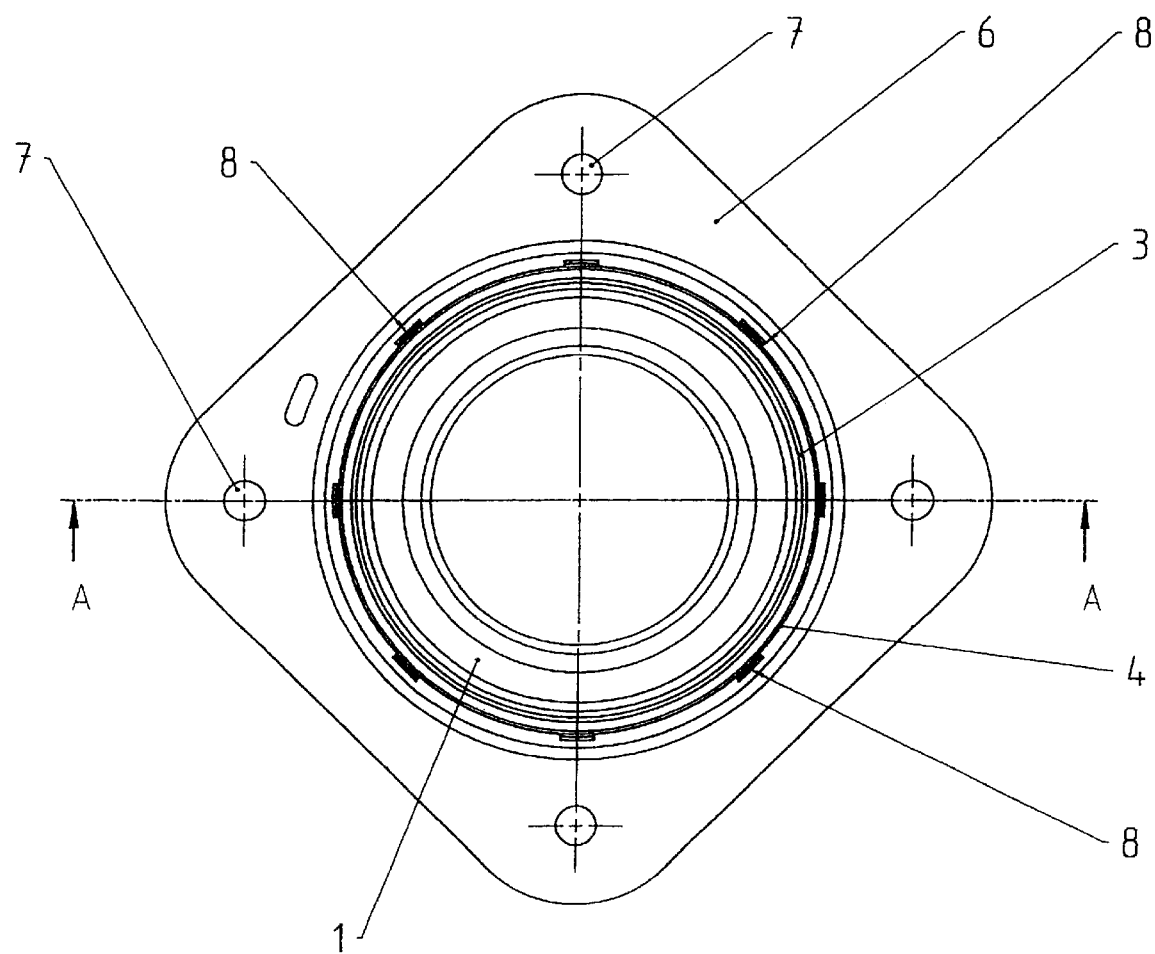
FIG. 2 depicts the gas inflator having the spring element and the supporting plate in a top view.

FIG. 2 depicts a top view of the gas inflator housing 1 having the spring element 4 and the supporting plate 6. The supporting plate 6 is roughly square and has mounting openings 7. The mounting ring 3 contacts the housing 1. The spring element 4 is secured to the mounting ring 3. The spring element 4 is furnished with eight projections 8 distributed around its circumference.

Figure 3:
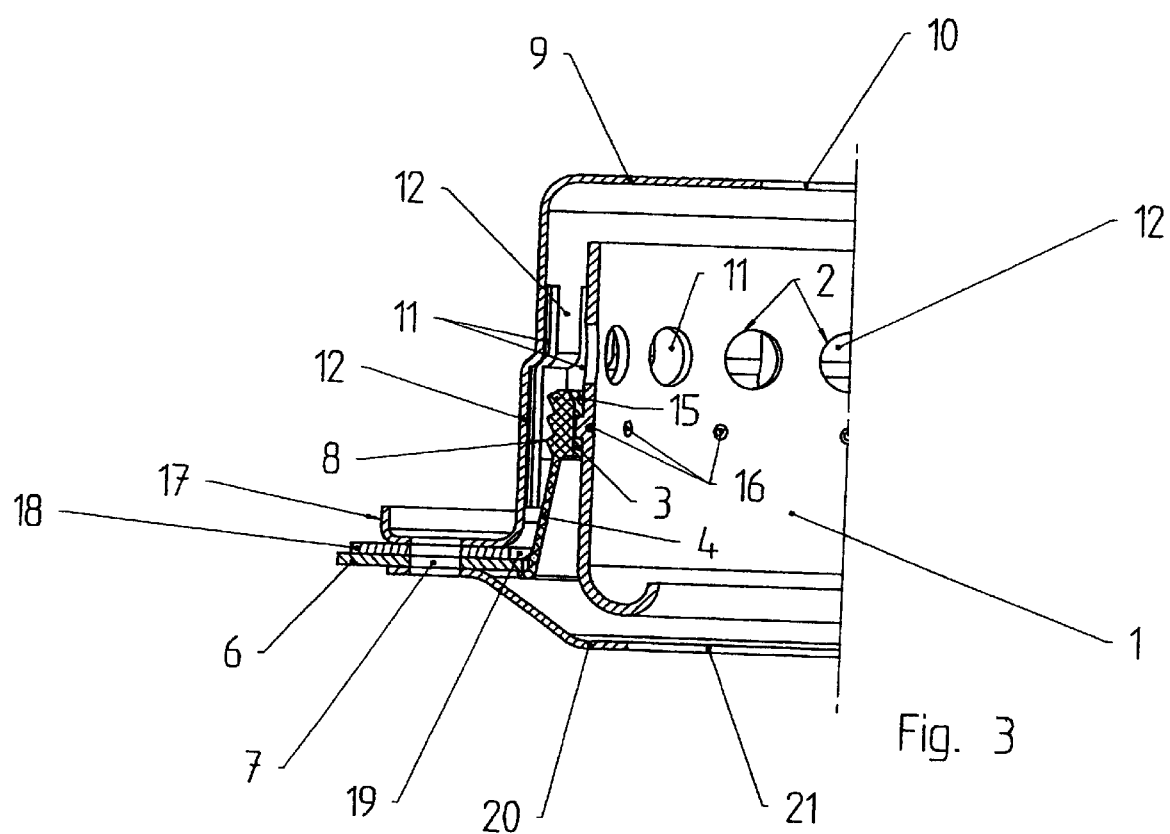
FIG. 3 depicts a cutaway view of the left half of the gas inflator having the spacer pot, in an enlarged illustration.

FIG. 3 depicts in enlarged form a cutaway view of the housing 1 of the gas inflator. The housing 1 is surrounded by a spacer pot 9, which protects the airbag, outwardly contacting the spacer pot 9, from contact with the vibrating housing 1. The housing 1 has a central opening 10 for the escape of gases, and is also provided on its wall with a series of vertical slots 11, also for the escape of gas. The wall parts 12 remaining between the slots 11 are situated in the area of the projections 8 of the spring element 4. The distance between the tips of the projections 8 and the wall parts 12 of the spacer pot 9 yields a vacant vibration space 13 for the gas inflator. If this vibration space 13 is traversed, a defined deceleration of the damping weight takes place as a result of projections 8.

The mounting ring 3, is pressed onto the gas inflator housing 1, and is flattened down at its upper edge 15. This makes it easier to press the mounting ring 3 onto the housing 1. In addition to the press fit, the mounting ring 3 is connected in a positive-locking manner to the housing 1 by point-shaped protrusions 16.

The spacer pot 9 is furnished with a plate edge 17, which has openings that correspond to the mounting openings 7. The plate edge 17 is bolted to the supporting plate 6. An edge 18 of a airbag opening 19 is inserted between the supporting plate 6 and the plate edge 17 and is clamped tight. Also connected to the supporting plate 6 is a guard plate 20. The guard plate 20 prevents the gas inflator from falling out of its holder after the spring element 4 is torn off. The guard plate 20 is furnished with an opening 21.

Figure 4:
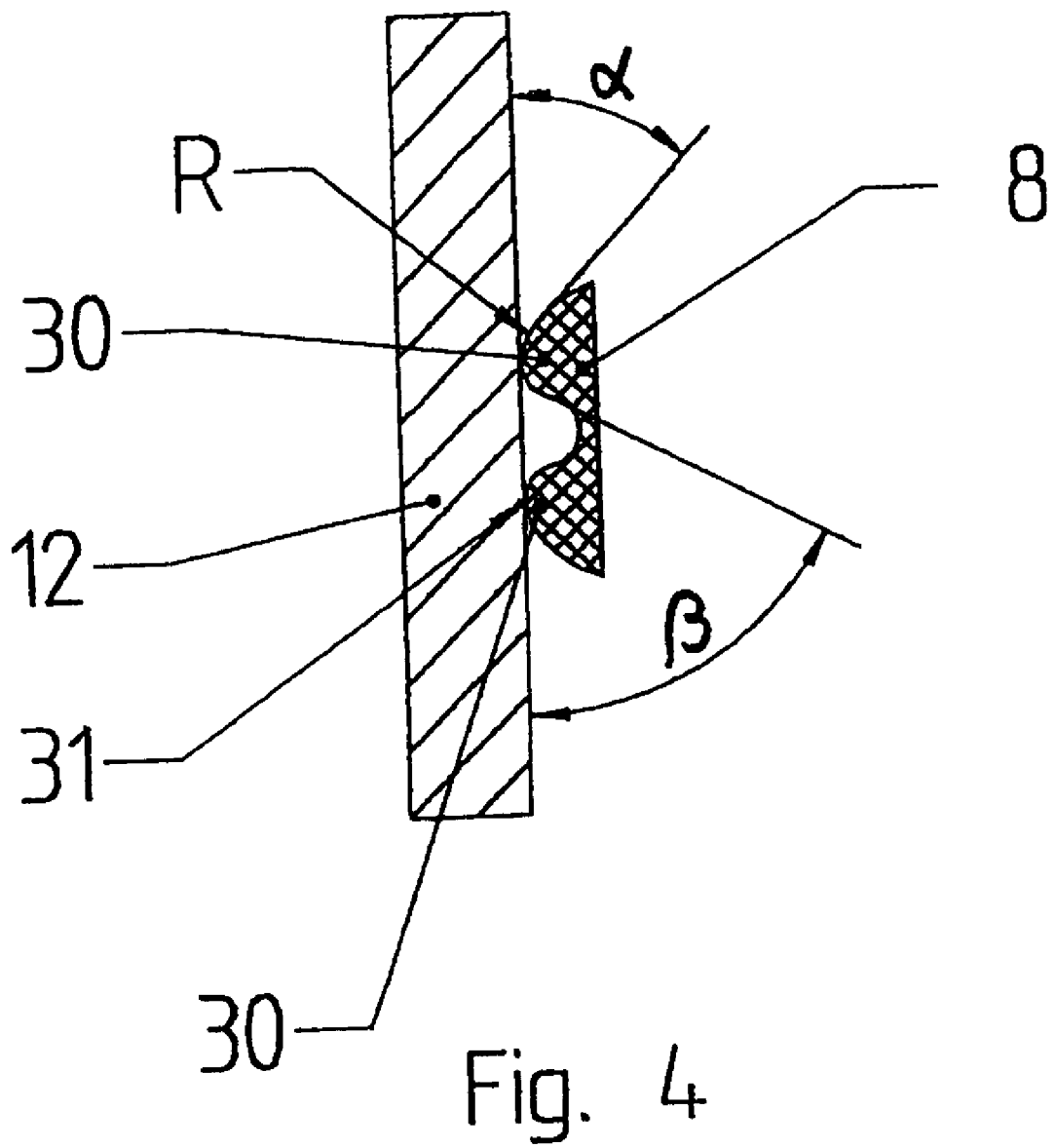
FIG. 4 depicts a projection having lip-shaped protuberances in a cutaway view, in an enlarged illustration.

FIG. 4 depicts in a cutaway view the configuration of a projection 8 that yields a preestablished spring rate. In this configuration, the projection 8 has two lip-shaped protuberances 30. Between a vertical line 31 and the wall 12 of the spacer pot 9 is the vibration space for the gas inflator. If this vibration space is traversed by the amplitude of the gas inflator, the protuberances 30 come into initially line-shaped contact with the wall 12 of the spacer pot 9, as shown in the Figure. The protuberances 30 are pressed together in accordance with the magnitude of the amplitude, resulting in a defined deceleration of the damper weight.

The deceleration can also be controlled as a result of the fact that the exterior angle α and an interior angle β of are configured on the lips 30 differently. Preferably, angle β is selected to be larger than angle α. In addition, radiuses R can be selected so as to be different with respect to vertical lines 31. The larger the radius R is, the higher the spring rate.

Figure 5:
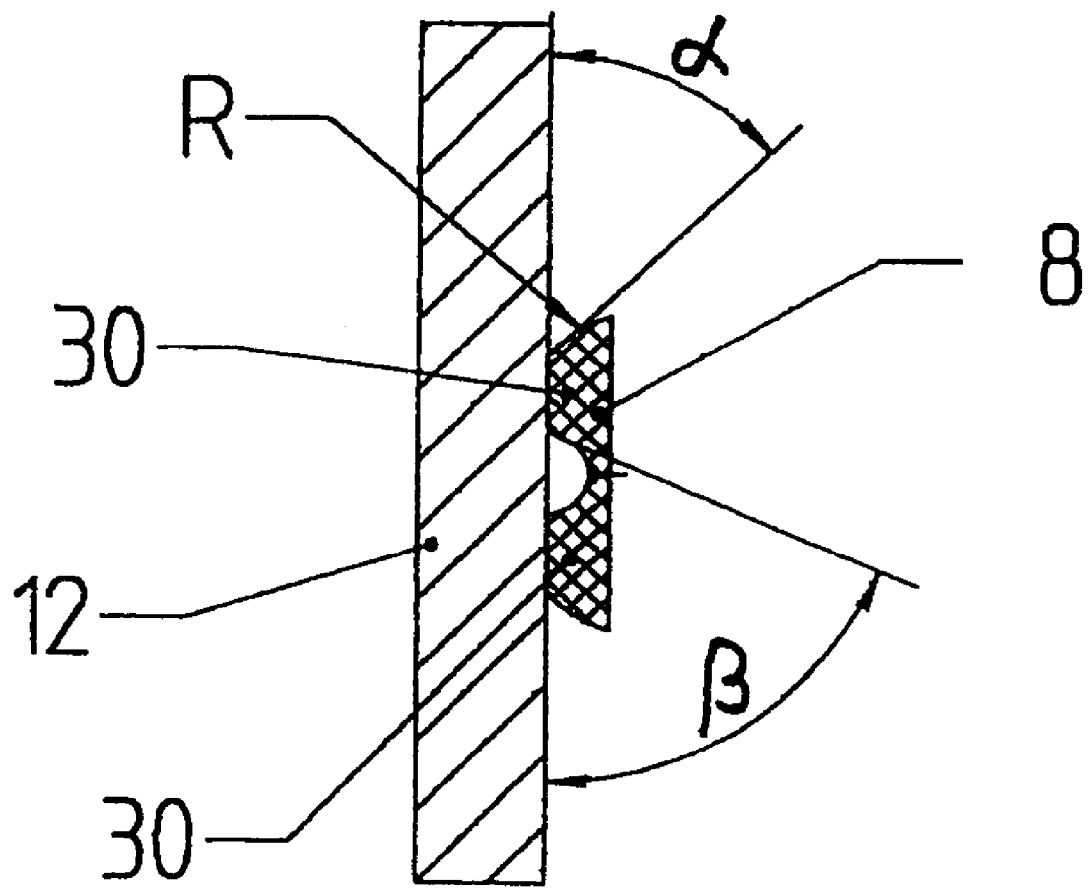
FIGS. 5/6 depict in cutaway view the protuberances pressed together in varying amounts.

In FIG. 5, protuberances 30 are further pressed together and the result is a more powerful deceleration of the vibrating weight.

Figure 6:
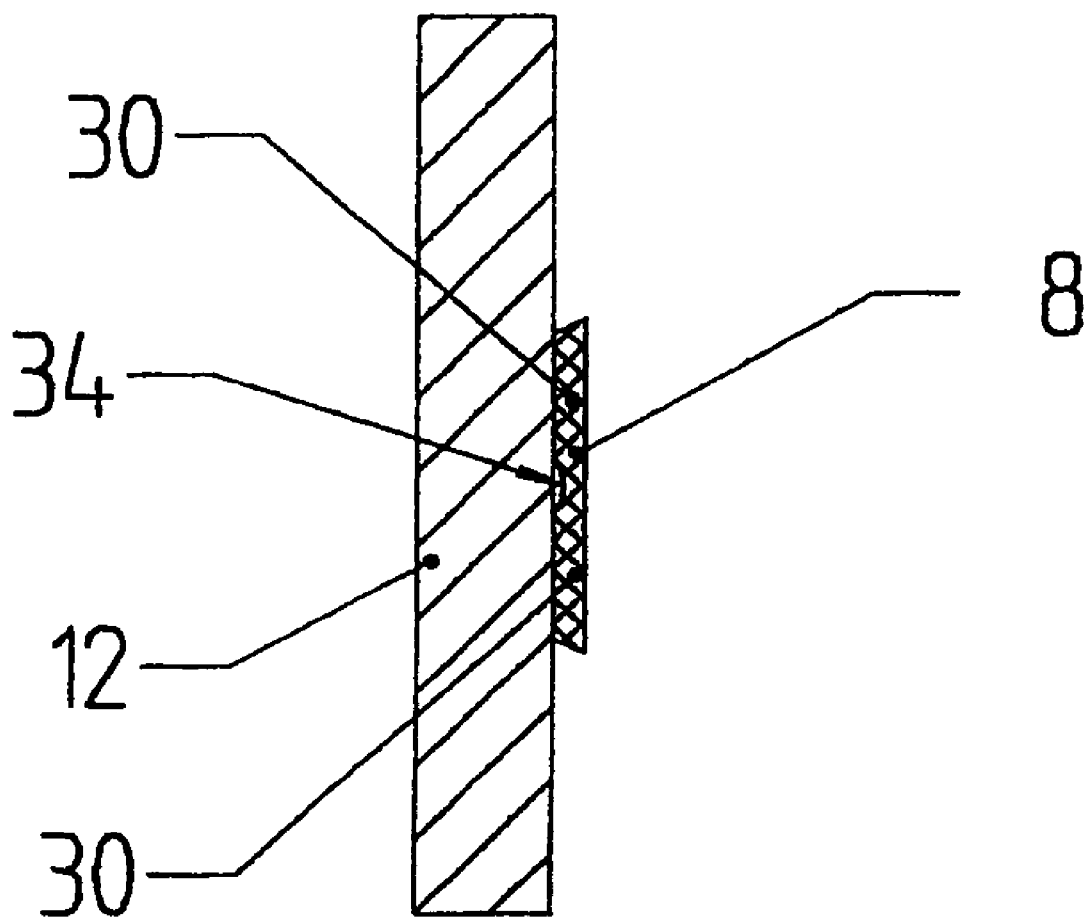

FIG. 6 shows an even further compression of protuberances 30 and therefore an even greater deceleration effect.

Of course, the deceleration effect is also determined by the choice of the polymer material employed. One skilled in the art has various possibilities, and can choose appropiate materials, angles, and radii to achieve the desired defined deceleration.

What is claimed:

1. A gas inflator for an airbag on a motor vehicle steering wheel, comprising:

a gas inflator movably supported in a spacer pot or in a protective sleeve of an airbag housing so that it functions as a vibration damper weight, a vacant vibration space being formed between the gas inflator and an interior wall of the spacer pot or protective sleeve;

an annular spring element made of a polymer material that is impermeable to gas, said annular spring element being connected to an outer wall of the gas inflator and to a supporting plate; and a plurality of individual projections circumferentially distributed on the exterior circumference of the annular spring element, the projections each having at least one lip-shaped or truncated cone-shaped protuberance and causing a defined deceleration of the vibration damper weight in response to the traversing of the vacant vibration space to dampen impact.

2. The gas inflator as recited in claim 1, wherein the annular spring element is configured as a sleeve-shaped truncated cone.

3. The gas inflator as recited in claim 1, wherein the elastic projections are arranged on the part of the spring element that is connected to the gas inflator.

4. The gas inflator as recited in claim 3, wherein the part of the spring element connected to the gas inflator is provided with an interior ring.

5. The gas inflator as recited in claim 4, wherein the interior ring extends over the entire height of the projections.

6. The gas inflator as recited in claim 4, wherein the exterior surface of the interior ring is connected by vulcanization to the annular spring element, configured as a rubber membrane.

7. The gas inflator as recited in claim 4, wherein the interior ring is connected in a form-locking manner to the housing of the gas inflator.

8. The gas inflator as recited in claim 7, wherein the interior ring is flattened down at its upper edge.

9. The gas inflator as recited in claim 1, wherein the end of the spring element connected to the supporting plate is vulcanized onto the supporting plate.

10. The gas inflator as recited in claim 9, wherein the spring element encircles the edge of the supporting plate in a bead-like manner.

11. The gas inflator as recited in claim 1, wherein a defined spring rate is preestablished by the shape of the projections.

* * * * *